Patented Jan. 8, 1924.

1,479,859

UNITED STATES PATENT OFFICE.

WILLIAM KOEHLER, OF CLEVELAND, OHIO.

PROCESS FOR MAKING ANTIFRICTION METAL.

No Drawing. Application filed September 5, 1922. Serial No. 586,321.

*To all whom it may concern:*

Be it known that I, WILLIAM KOEHLER, a citizen of the United States, residing in Cleveland, in the county of Cuyahoga and State of Ohio, have invented new and useful Improvements in Processes for Making Antifriction Metal, of which the following is a specification.

This invention relates to a new and improved process for producing an anti-friction composition for bearings and the like.

The object of this invention is to provide a material of this character which will be strong, nonabrasive and self-lubricating.

With this object in view and with the intention of securing other advantages which will hereinafter appear, my invention consists in the combination of metals and the method of procedure described in the specification and particularly pointed out in the claims.

In carrying out my process I take a quantity of metal as the base metal, preferably copper and reduce the same to a finely comminuted state, by any of the well known methods but preferably through electrolysis. I then take a quantity of another metal having a lower melting point than the first metal or base metal as the binder metal. When using copper as the base metal it is preferable to use tin as the second or binding metal. This second metal is reduced to a finely comminuted state corresponding to the condition of the copper.

The copper and tin are then intimately mixed together and to the mixture of the metals is added a quantity of powdered graphite. I have found that a mixture of 80% copper, 10% tin, and 10% graphite give very good results.

After the metals and the graphite have been thoroughly mixed together, I subject the mixture to a predetermined pressure in a suitable mold. The mixture may be pressed into ingots, bars or the like, to be machined afterwards, or may be pressed directly into the form or shape in which it is to be used.

After the mixture has been pressed or molded I subject the pressed material to the action of heat in a reducing atmosphere. The temperature of the oven must be sufficiently high to melt the tin and preferably sufficiently high to bring the copper close to its melting point but not up to the melting point, that is to the condition which is called "sweating" point. The melted tin will thoroughly amalgamate with the copper and graphite and act as a binder for the entire mass.

In some instances the composition after being removed from the oven and while still hot may be subjected to an additional pressure or hammering but this is only necessary when great tensile strength is required in the composition.

What I claim is:—

1. The process of producing an antifriction metal consisting in mixing together finely comminuted metals of different melting points and then subjecting the mixture to a temperature, sufficiently high to melt the metal having the lowest melting point.

2. The process for forming an anti-friction composition consisting in taking metals of different melting points, reducing the metals to a finely comminuted condition and thoroughly mixing the metals together, then subjecting the mixture to a predetermined pressure and then subjecting the pressed mass to a temperature sufficiently high to melt the metal having the lower melting point but not high enough to melt the metal having the higher melting point.

3. The process for forming an anti-friction metal consisting in taking metals of different melting points, reducing the metals to a finely comminuted condition and thoroughly mixing the metals together and adding a quantity of powdered graphite, and then subjecting the mixture to a temperature high enough to melt the metal having the lower melting point but not sufficiently high to melt the other metal.

4. The process for forming an anti-friction composition consisting in taking a metal suitable as a base and a metal of a lower melting point suitable as a binder, reducing the metals to a finely comminuted condition and then thoroughly mixing the powdered metals together, then subjecting the mixture to a predetermined pressure, then raising the temperature of the mass only to the melting point of the binder metal and then subjecting the heated mass to additional pressure.

5. The process for forming an anti-friction metal consisting in mixing together finely comminuted metals of different melting points together with a quantity of graphite, subjecting the mixture to a predetermined pressure and then heating the pressed mass slightly in excess of the melting point of the metal having the lower melting point.

6. The process of producing an anti-friction metal consisting in taking a metal suitable for a base, a metal suitable for a binder and a lubricating material, reducing each ingredient to a finely comminuted condition thoroughly mixing all ingredients together, subjecting the mixture to a predetermined pressure and then raising the temperature of the pressed mass to a point above the melting point of the metal having the lower melting point but not sufficiently high to melt the base metal.

7. The process of producing an anti-friction metal consisting in taking a quantity of copper and tin, reducing to a finely comminuted condition, mixing thoroughly together and adding thereto a quantity of powdered graphite, subjecting the mass to a predetermined pressure and then raising the temperature of the pressed mass to the melting point of tin but below the melting point of copper.

8. A composition consisting of finely comminuted metal and graphite, subjected to pressure and heated to a temperature below the melting point of the higher melting constituent and above the temperature of the melting point of the lower melting constituent.

9. The process of producing an anti-friction metal consisting in mixing together finely comminuted metals of different melting points and then subjecting the mixture in a reducing atmosphere to a temperature sufficiently high to melt the metal having the lowest melting point.

In testimony whereof, I sign the foregoing specification in the presence of two witnesses.

WILLIAM KOEHLER.

Witnesses:
VICTOR C. LYNCH,
RUDD H. BENDER.